R. E. HELLMUND.
PHASE CONVERTER SYSTEM.
APPLICATION FILED AUG. 7, 1916.

1,335,109.

Patented Mar. 30, 1920.

WITNESSES:
Fred. A. Lind.
O. C. Davis.

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

PHASE-CONVERTER SYSTEM.

1,335,109.  Specification of Letters Patent.  Patented Mar. 30, 1920.

Application filed August 7, 1916. Serial No. 113,456.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Phase-Converter Systems, of which the following is a specification.

My invention relates to systems of control for phase-converters, more particularly for those of the T-connected, rotary type provided with direct-current excitation for synchronous operation, and it has for its object to provide means whereby a phase-converter of the type designated may be started and placed in operation with a minimum of line disturbance and whereby, upon a very brief cessation of power, the direct-current excitation is removed, permitting the apparatus to run temporarily as an asynchronous machine.

Another object of my invention is to provide means whereby, if apparatus of the character designated is subjected to a cessation of power supply for more than a given period of time, it is automatically disconnected from the circuit.

Still another object of my invention is to provide means for accurately and automatically maintaining the power-factor of a phase-converter at a predetermined amount, in spite of variations in the supply voltage.

Figure 1:
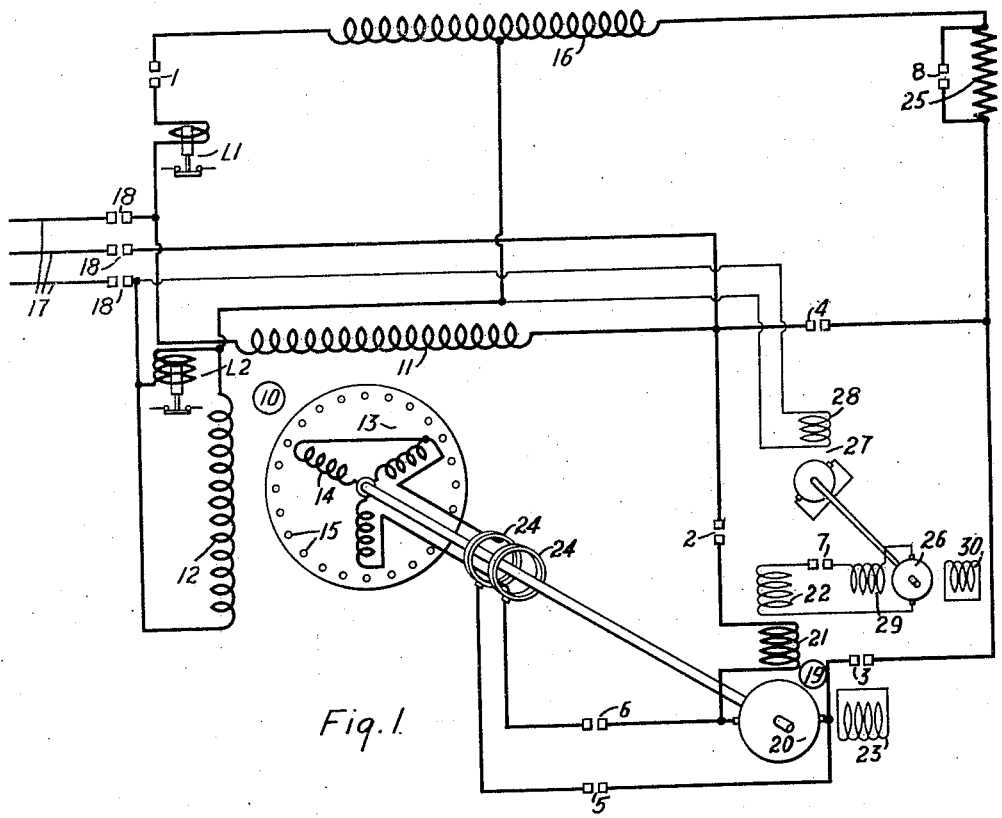
Figure 2:
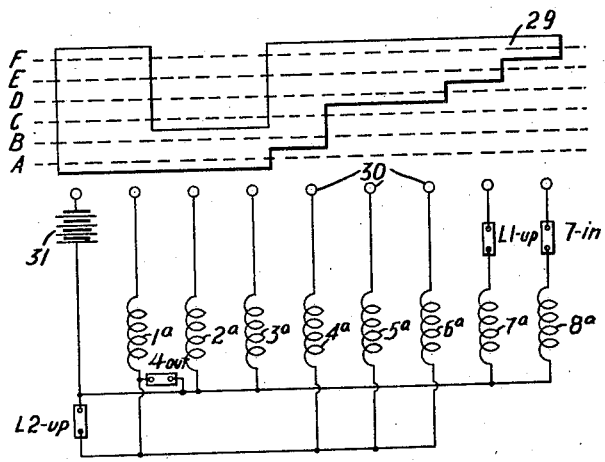

In the accompanying drawing, Figure 1 is a diagrammatic view of a phase-converter of the rotary T-connected type, together with auxiliary apparatus, constructed in accordance with my invention, and Fig. 2 is a diagrammatic view of a control system wherewith the proper coaction of the various elements of the system of Fig. 1 may be obtained.

Referring to Fig. 1 for a more detailed understanding of my invention, a phase-converter is shown at 10 and comprises a primary stator winding 11, a tertiary winding 12 and a rotor 13 provided with a secondary phase winding 14 and with a secondary squirrel-cage winding 15. Energy for the operation of the phase-converter 10 is obtained from any suitable source, such, for example, as a transformer winding 16, and energy derived directly from the source, together with energy derived from the tertiary winding 12, is supplied to a polyphase load circuit 17 through suitable load switches 18—18. A combined starting motor and exciting generator 19 of the commutator type has its armature 20 mounted upon the shaft of the phase-converter 10 or is otherwise mechanically coupled thereto and comprises, in addition, two exciting field windings 21 and 22 and a short-circuited, compensating field winding 23. The brushes of the machine 19 may be connected across one phase of the phase winding 14 through suitable slip rings 24—24 upon the closure of switches 5 and 6. The right-hand brush of the machine 19 may be connected to a terminal of the source 16 by closing a switch 3. Said connection is completed through a resistor 25 which may be short-circuited by a suitable switch 8.

The exciting field winding 21 may be connected in series with the armature 20 by closing a switch 2. The exciting field winding 22 may be energized by a small direct-current generator 26 driven by a repulsion motor 27, the field winding 28 of which is connected across the terminals of the tertiary winding 12 of the phase converter. The generator 26 is provided, in addition to an ordinary series exciting winding 29, with a short circuited field winding 30 mounted coaxially with the winding 29. The primary winding 11 may be connected across the source 16 by closing switches 1 and 4.

A current-limit switch L1 has its operating coil inserted in the left-hand supply lead, and a voltage-limit switch L2 has its operating winding connected across the tertiary field winding 12. All of the switches 1 to 8, inclusive, may be of any desired distant-control type, such, for example, as ordinary electromagnetic switches or switches of the pneumatically operated type having electrically operated valves for controlling the supply of pressure fluid thereto.

I have shown the main contact segment of a controller suitable for the operation of the system of Fig. 1 in a developed view at 29 in Fig. 2. Suitable control studs 30—30 are mounted to coact therewith and to supply energy to the operating coils 1$^a$ to 8$^a$, inclusive, of the switches 1 to 8 from a suitable control battery 31. The operating coil 7$^a$ is connected in series with the contact studs L1—up of the limit switch L1 and, in like manner, the operating coils 1ª, 4ª, 5ª and 6ª are connected in series with the contact studs L2—up of the switch L2. Current may also traverse the operating coil 1ª through an interlock 4—out without traversing the interlock L2—up. The switch 7 is provided with an interlock of usual form and said interlock is connected in series with the operating coil 8ª of the switch 8 for a purpose to be hereinafter pointed out.

Having thus described the arrangement of a system embodying my invention, the operation is as follows: The contact segment 29 is first moved to the position A and the switches 1, 2 and 3 are thereby closed, connecting the primary winding 11 to the source 16 in series with the exciting field winding 21 and the armature 20 of the auxiliary machine 19 and also in series with the resistor 25. During this step, the current for the energization of the winding 1ª flows through the interlock 4—out. Movement of the controller to the position B closes the switch 4, thus short circuiting the auxiliary machine 19 and, in the succeeding position C, the switches 2 and 3 connected to said machine are opened. At this time, the machine 19 has completed its function as a starting motor and the phase-converter 20 is operating at slightly under synchronous speed.

The next phase of the starting operation consists in causing the machine 19 to operate as an exciting generator to supply direct current to the rotor 14 for synchronous operation and for power-factor compensation. To this end, the segment 29 is moved to the position D, closing the switches 5 and 6 and connecting the brushes of the machine 19 to the phase winding 14 of the phase-converter rotor. The closure of the switches 4, 5 and 6 is conditional upon the closure of the interlock L2—up which necessitates the more or less complete energization of the tertiary winding 12 of the phase converter. The supply of load current flowing to the converter maintains the switch L1 in a closed position so that the movement of the segment 29 to the position E closes the switch 7 and thereby permits the generator 26 to energize the exciting field winding 22, thus causing the machine 19 to generate direct current for the excitation of the machine 10. The closure of the switch 7, together with the movement of the segment 29 to the position F, closes the switch 8, short circuiting the resistor 25 and establishing the final or running condition.

If, in a phase-converter system of the general type described, the direct-current exciting source be adjusted for exact compensation at a given supply voltage, there results either over or under compensation if the supply voltage changes. By the specific connections which I have above outlined, the voltage supplied to the field winding 28 of the repulsion motor 27 varies directly with the voltage of the tertiary winding 12 of the phase converter and, therefore, in accordance with the supply voltage. The speed of the motor 27 and, consequently, the voltage of the machine 26, the energization of the exciting field winding 22, the voltage of the armature 20, and, finally, the direct-current excitation of the winding 14 all vary in accordance with the supply voltage. It is possible, therefore, to provide more or less exact compensation in the machine 10 over a wide range of voltage variation in the source 16.

If, in the operation of the system of Fig. 1, there is a momentary cessation in the power supply, the limit switch L1 falls, opening the switch 7 and thus disconnecting the direct-current exciting circuit of the machine 19, removing the direct-current excitation of the phase-converter. The opening of the switch 7 is followed by the opening of the switch 8 because of the mutual interlock, thus inserting the resistor 25 in circuit as a current-limiting measure. If the power interruption lasts for an instant only, the return of power to the line picks up the contact member of the switch L1, again closing the switch 7 and permitting continued operation.

The building up of the voltage of the machine 26 is retarded by the short-circuited field winding 30, insuring that the direct-current excitation is not thrown upon the phase-converter too abruptly.

The closure of the switch 7 is followed by the closure of the switch 8, eliminating the resistor 25 from the circuit but, in the meantime, the resistor 25 will have performed its preventive function and smoothed out possible current peaks.

If, however, the power cessation lasts for such a length of time that the phase converter loses a predetermined portion of its magnetically stored energy, of which the dissipation is retarded by the short-circuited winding 15, the limit switch L2 falls, opening the switches 1, 4, 5 and 6, disconnecting the phase-converter from the source 16 and the exciting machine from the phase-converter. There follows at once the de-energization of the switch L1 with the opening of the switch 7 and, as a result, of the switch 8, the motor 27 stopping at the same time because of the cutting off of the energy supplied thereto. The entire system is then in a condition of shut-down and must be started *de novo*.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a source of alternating current, of a phase-converter of the rotary type connected thereto, means for supplying direct current to the secondary winding thereof, and quick-acting means for disconnecting said direct-current supply means upon a momentary interruption of the power supply to said phase converter without disconnecting said converter from said alternating-current source.

2. The combination with a source of alternating current, of a phase-converter of the rotary type connected thereto, means for supplying direct current to the secondary winding thereof, and quick-acting means for disconnecting said direct-current supply means upon a momentary interruption of the power supply to said phase-converter and for reconnecting said direct-current exciting means of said power interruption is of but short duration, all without disconnecting the converter from the alternating-current source.

3. The combination with a source of alternating current, of a phase-converter of the rotary type connected thereto, means for supplying direct current to the secondary winding thereof, quick-acting means for disconnecting said direct-current supply means upon an interruption of the power supply to said phase converter and for reconnecting said direct-current exciting means if said power interruption is of short duration, and means for rendering said reconnecting means inoperative if the power interruption is of such duration that the phase-converter falls in speed to such a degree that it cannot pull back into synchronism.

4. The combination with a source of alternating current, of a phase-converter of the rotary type connected thereto, direct-current exciting means for the secondary winding of said phase converter, and a line relay having its operating winding connected in one of the main supply leads of said converter and operative upon a cessation of power to disconnect said exciting means.

5. The combination with a source of alternating current, of a phase-converter of the rotary type connected thereto, direct-current exciting means for the secondary winding of said phase converter, and a line relay having its operating winding connected in one of the main supply leads of said converter and operative to disconnect said exciting means upon a cessation of power and further operative to permit the reconnection of said exciting means if the cessation of power is of short duration only.

6. The combination with a source of alternating current, of a phase-converter of the rotary type connected thereto, and a relay having its operating winding connected across a winding of said phase-converter and operative to disconnect said phase converter from said source, when, upon a cessation of power in said source, the stored energy of said converter falls to a predetermined amount.

7. The combination with a source of alternating current, of a phase-converter of the rotary type connected thereto, direct-current exciting means for the secondary winding of said phase converter, and a line relay having its operating winding connected in one of the main supply leads of said converter and operative to disconnect said exciting means upon a cessation of power and further operative to reconnect said exciting means if the cessation of power is of short duration, and means operative to disconnect said phase-converter from said source if the cessation of power exceeds a predetermined time.

8. The combination with a source of alternating current, of a phase-converter of the rotary type connected thereto, direct-current exciting means for the secondary winding of said phase converter, a line relay having its operating winding connected in one of the main supply leads of said converter and operative to disconnect said exciting means upon a cessation of power and further operative to reconnect said exciting means if the cessation of power is of short duration, and means operative to disconnect said phase-converter from said source if the cessation of power exceeds the time for the phase-converter stator to lose a predetermined portion of its stored energy.

9. The combination with a source of alternating current, of a phase-converter of the rotary type connected thereto, direct-current exciting means for the secondary winding of said phase converter, a line relay having its operating winding connected in one of the main supply leads of said converter and operative to disconnect said exciting means upon a cessation of power, and further operative to reconnect said exciting means if the cessation of power is of short duration, and a relay having its operating winding connected across a winding of said phase-converter and operative to disconnect said phase converter from said source, when, upon a cessation of power in said source, the stored energy of said converter winding falls to a predetermined amount.

In testimony whereof, I have hereunto subscribed my name this 21st day of July, 1916.

RUDOLF E. HELLMUND.